(12) United States Patent
Chang

(10) Patent No.: US 7,016,190 B1
(45) Date of Patent: Mar. 21, 2006

(54) HARD DISK ANCHORING APPARATUS

(75) Inventor: Lin-Wei Chang, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 11/134,272

(22) Filed: May 23, 2005

(51) Int. Cl.
*G06F 1/16* (2006.01)
*H05K 7/00* (2006.01)

(52) U.S. Cl. .................. 361/685; 248/221.11; 235/381

(58) Field of Classification Search .................. 29/726, 29/37 R; 248/221.11; 235/381; 361/724–727, 361/679–685, 825, 797, 798, 801
See application file for complete search history.

(56) References Cited

U.S. PATENT DOCUMENTS

| | | | |
|---|---|---|---|
| 6,606,256 B1 * | 8/2003 | Lee et al. .................... | 361/825 |
| 6,775,132 B1 * | 8/2004 | Chen et al. .................. | 361/685 |
| 6,798,652 B1 | 9/2004 | Wang et al. | |
| 2004/0240171 A1 | 12/2004 | Liao | |
| 2005/0185372 A1 * | 8/2005 | Chen et al. .................. | 361/685 |
| 2005/0195563 A1 * | 9/2005 | Chung .......................... | 361/685 |

* cited by examiner

*Primary Examiner*—Hung Van Duong
(74) *Attorney, Agent, or Firm*—Birch, Stewart, Kolasch & Birch, LLP

(57) ABSTRACT

A hard disk anchoring apparatus for retaining a hard disk with a plurality of screw holes includes a coupling seat, a fixed bracket and a movable bracket. The fixed bracket is fixedly coupled with the coupling seat. The movable bracket is movably hinged on the coupling seat. A coupling blade is provided to couple the fixed bracket and the movable bracket. The fixed bracket and the movable bracket each have fasteners matching the screw holes formed on two sides of the hard disk. The movable bracket may be swiveled to close to the fixed bracket and coupled through the coupling blade. Thus the hard disk is retained by latching the movable bracket and the fixed bracket.

6 Claims, 8 Drawing Sheets

HARD DISK ANCHORING APPARATUS

FIELD OF THE INVENTION

The invention relates to mount a hard disk in a computer chassis, and particularly to a toolless hard disk anchoring apparatus for installing and removing a hard disk without tools.

BACKGROUND OF THE INVENTION

The conventional approach now being adopted to mount a hard disk in a computer chassis generally involves placing the hard disk in a holding area of a drive bracket; screwing a plurality of screws through side walls of the drive bracket into two sides of the hard disk body to fasten the hard disk on the drive bracket; and mounting the hard disk and the frame in a computer chassis or a mobile hard disk rack. For the steadiness of the hard disk and balance fastening of the screws, multiple screws have to be fastened at the same time. Installing and removing operations of the hard disk are tedious.

To remedy the aforesaid disadvantages, improved designs for fastening and removing the hard disk to and from the anchor frame with few screws have been developed. For instance, reference of hard disk mounting devices can be found in U.S. Pat. Nos. 6,775,132 and 6,798,652. They all comprise a cover and a bracket coupling together to clamp a hard disk on an upper side and a lower side to retain the hard disk. U.S. patent publication No. 20040240171 discloses yet another "Hard disk latch structure," which has screws fastened to two sides of a hard disk body in advance, then the screws are latched on retaining troughs preformed on receiving plates to mount the hard disk on the hard disk bracket.

All the hard disk mounting devices set forth above aim to mount the hard disk in a chassis, but cannot be adopted on removable hard disk anchoring structures. Although they provide the benefit of fast removal, the host case still must be removed to change or replace the hard disk.

SUMMARY OF THE INVENTION

In view of the aforesaid problems, the primary object of the invention is to provide a hard disk anchoring apparatus to mount or remove a hard disks quickly without using tools, and also to be adaptable to removable hard disk rack.

The hard disk anchoring apparatus according to the invention aims to retain a hard disk that has a plurality of screw holes. To achieve the foregoing object, the invention comprises a coupling seat that has a first hinge section, a fixed bracket that has a fixed bottom plate coupling with the coupling seat and a fixed side wall having a plurality of first fasteners, and a movable bracket that has a movable bottom plate and a movable side wall. The movable bottom plate has a second hinge section and a latch hole. The first hinge section and the second hinge section are coupled through an axle to hinge the movable bracket on the coupling seat, so that the movable bracket may be swiveled relative to the coupling seat and the fixed bracket. The movable bracket may be moved close to the fixed bracket or moved away from the fixed bracket. The movable side wall has a plurality of second fasteners. A coupling blade is provided that has one end fixed on the fixed bottom plate and a latch element on another end to engage with the latch hole on the movable bottom plate. The movable bracket may be moved close to the fixed bracket to allow the first and second fasteners to engage in the screw holes on two sides of the hard disk. The latch element of the coupling blade can be engaged with the latch hole of the movable bottom plate to retain the hard disk between the movable bracket and the fixed bracket. The hard disk anchoring apparatus may be fixed in a computer chassis, or be coupled with an outer frame to form a mobile hard disk rack.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
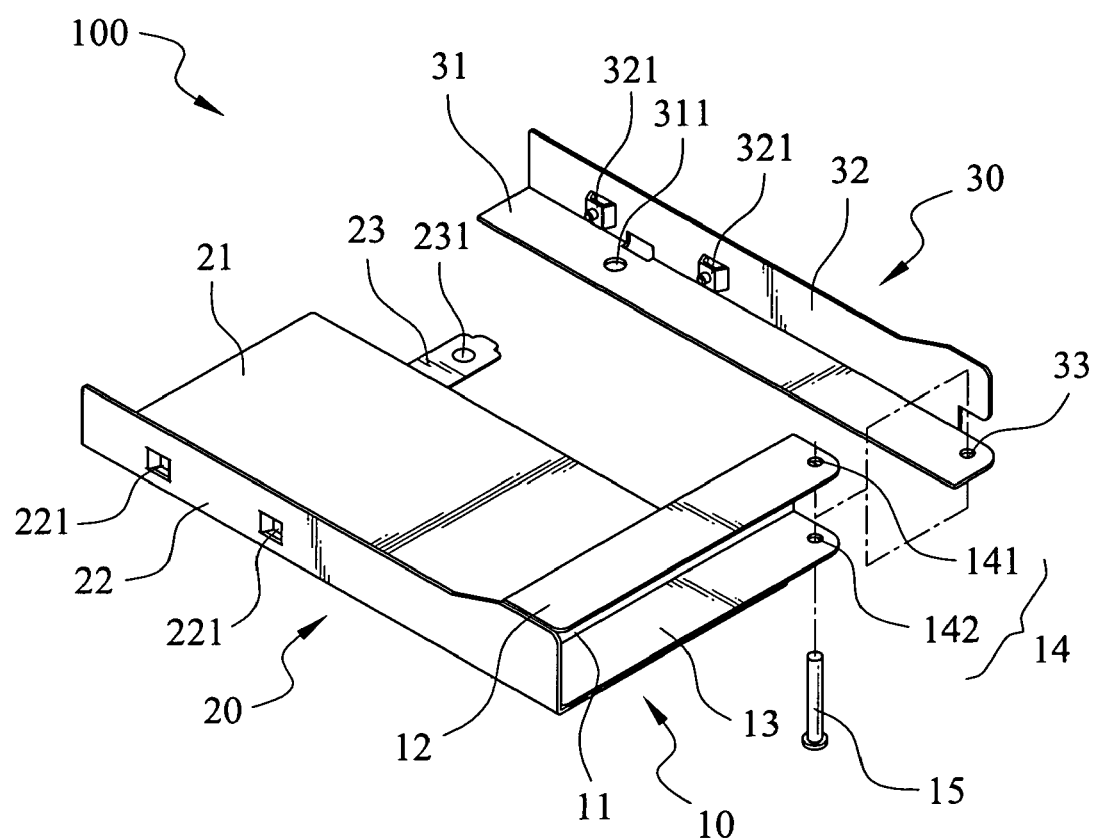
FIG. 1 is an exploded view of a first embodiment of the invention.

Refer to FIG. 1 for a first embodiment of the invention. The hard disk anchoring apparatus 100 aims to retain a hard disk 200 with a plurality of screw holes 210.

The hard disk anchoring apparatus 100 comprises a coupling seat 10 witch has a rectangular front wall 11. A top slab 12 and a bottom slab 13 extend perpendicularly from the opposite edges of the front wall 11. The top slab 12 and the bottom slab 13 have respectively pivot holes 141 and 142 on their edges close to the short side of the front side wall 11 to form a first hinge section 14. An axle 15 can pass through the first hinge section 14.

A fixed bracket 20 is fixedly mounted to the coupling seat 10. The fixed bracket 20 has a fixed bottom plate 21 and a fixed side wall 22 with two first fasteners 221.

A movable bracket 30 has a movable bottom plate 31 and a movable side wall 32. The movable bottom plate 31 has a second hinge section 33 on one side that is a round hole, and is coupled with the first hinge section 14 through the axle 15 to couple the movable bottom plate 31 with the bottom slab 13 of the coupling seat 10. The movable bracket 30 can be swiveled relative to the coupling seat 10, and selectively moved close to the fixed bracket 20 or moved away from the fixed bracket 20 to form an angle therebetween. The movable bottom plate 31 further has a latch hole 311, and the movable side wall 32 has two second fasteners 321.

A coupling blade 23 has one end attached to the fixed bottom plate 21 and another end extended outside of the fixed bottom plate 21 towards the movable bottom plate 31. A latch element 231 is formed on the extended end of the coupling blade 23. The latch element 231 can engage with the latch hole 311 of the movable bottom plate 31.

Figure 2A:
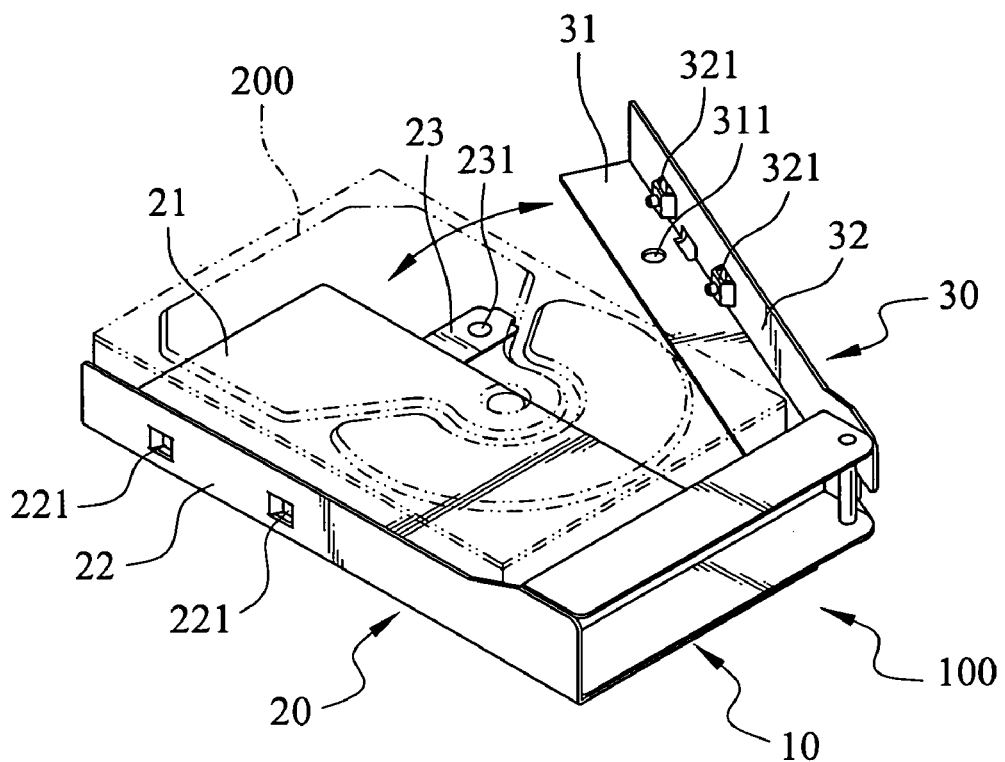
FIG. 2A is a perspective view of the first embodiment of the invention.
Figure 2B:
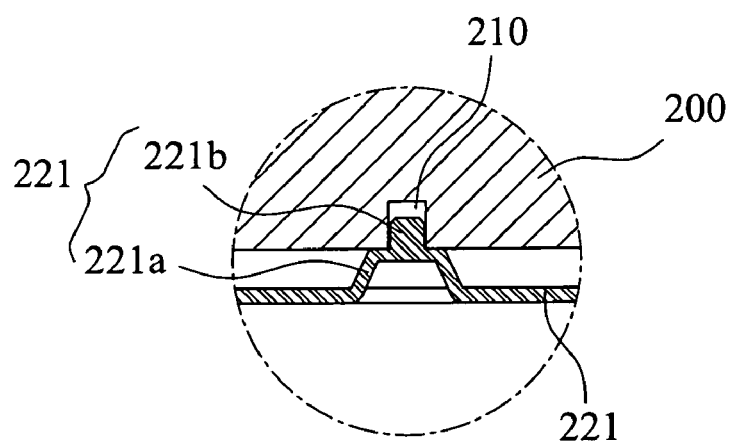
FIG. 2B is a fragmentary sectional views according to FIG. 2A.
Figure 2C:
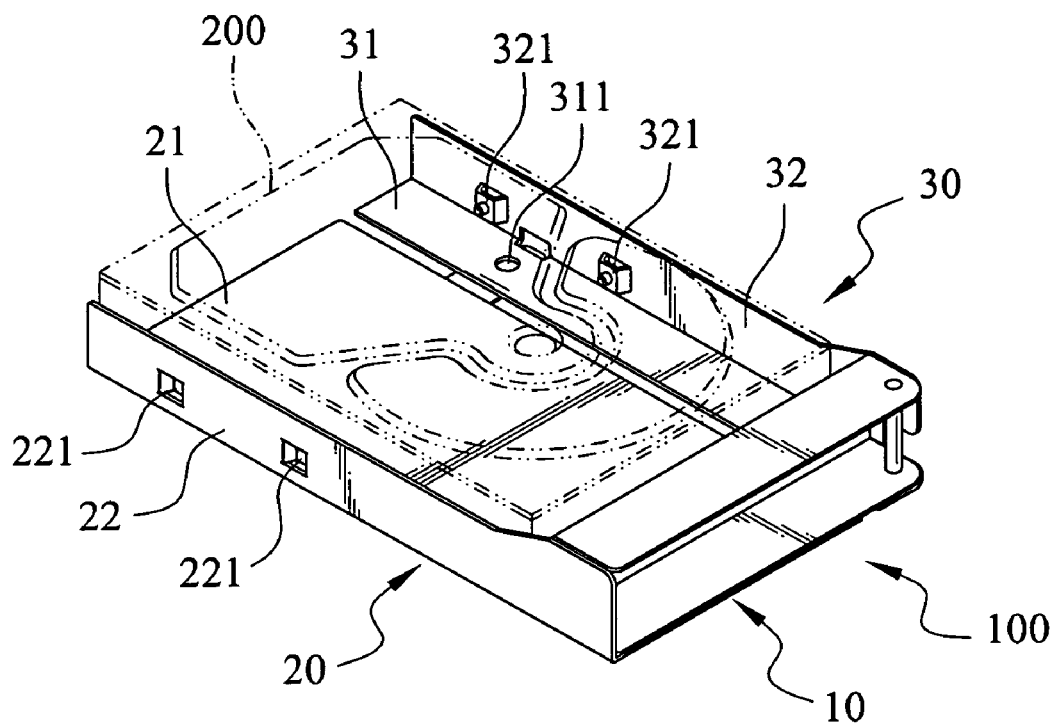
FIG. 2C is another perspective view of the embodiment shown in FIG. 2A.
Figure 2D:
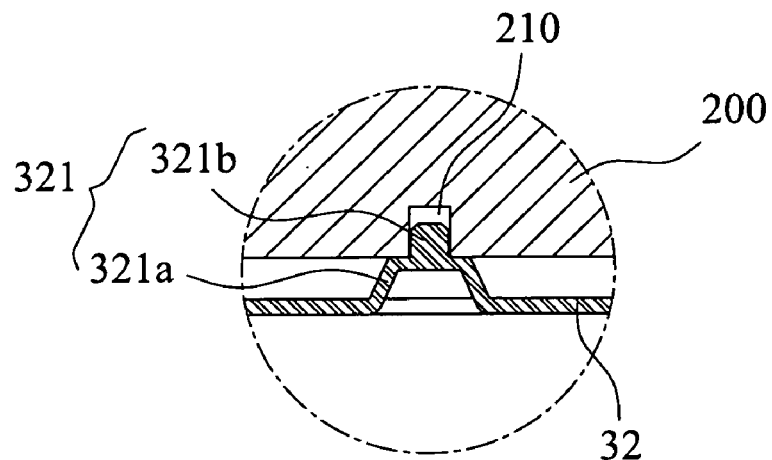
FIG. 2D is a fragmentary sectional views according to FIG. 2B.

Referring to FIGS. 2A through 2D, the hard disk 200 is mounted onto the fixed bottom plate 21 with one side close to the fixed side wall 22, so that the two first fasteners 221 are engaged with the screw holes 210, as shown in FIG. 2C. The movable bracket 30 is then swiveled and the movable bottom plate 31 is close to the fixed bottom plate 21 as shown in FIG. 3C. The second fasteners 321 on the movable side wall 32 are engaged with other screw holes 210 on the other side of the hard disk 200, as shown in FIGS. 2B and 2D. Thus the hard disk 200 is retained between the fixed side wall 22 and the movable side wall 32 through the first fasteners 221, the second fasteners 321, and the screw holes 210.

The first fasteners 221 and the second fasteners 321 are formed by stamping. Each of the fasteners has a jutting base 221a or 321a, and a strut 221b or 321b extended from the jutting base 221b or 321b. The struts 221b and 321b are located on positions corresponding to the screw holes 210 of the hard disk 200 and are of mating size so as to form a coupling effect.

Figure 3A:
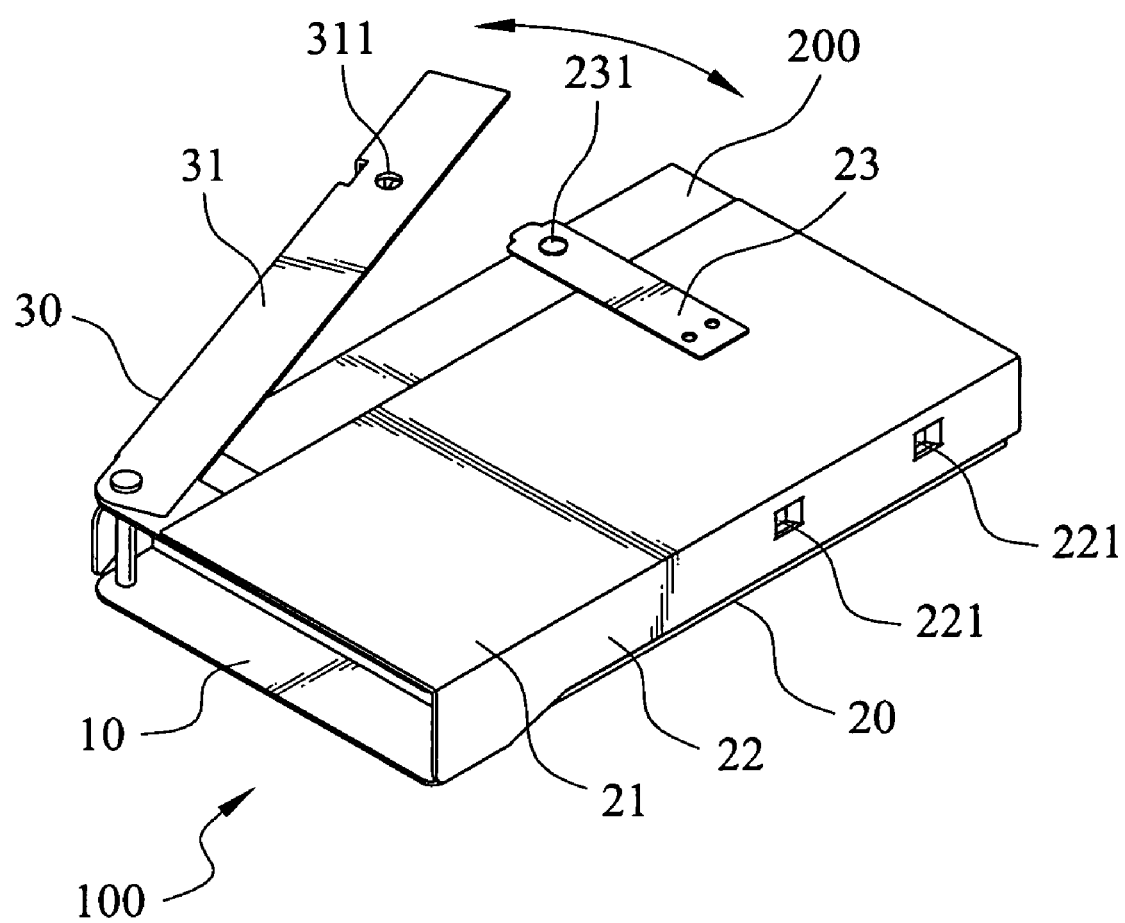
FIG. 3A is another perspective view according to FIG. 2A.
Figure 3B:
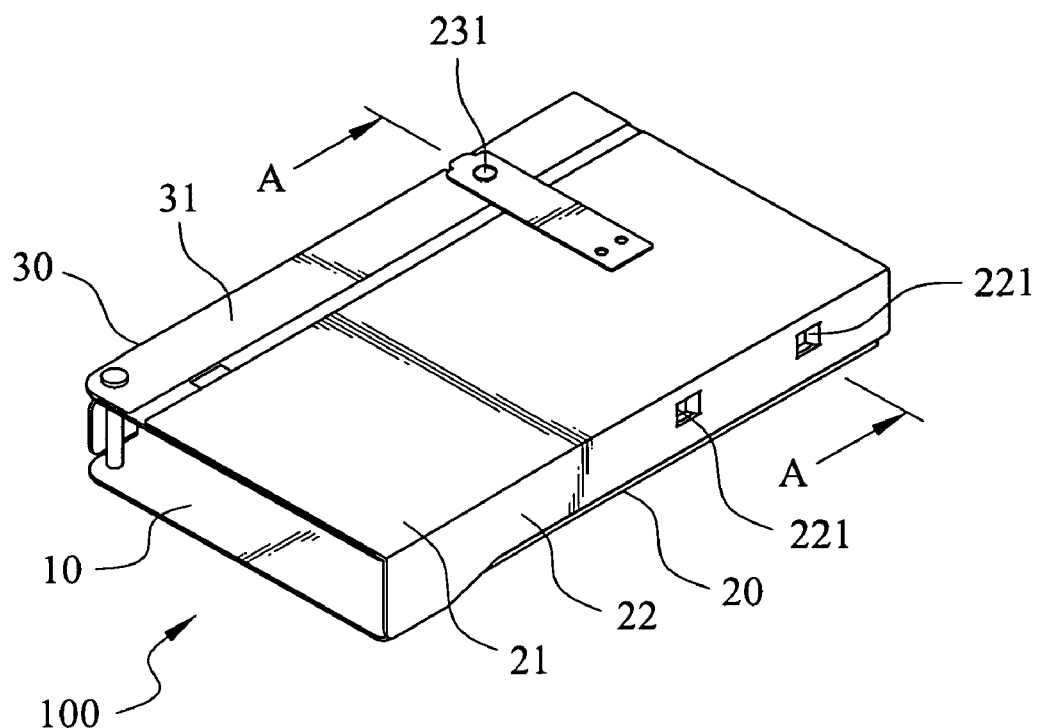
FIG. 3B is another perspective view according to FIG. 2B.
Figure 3C:
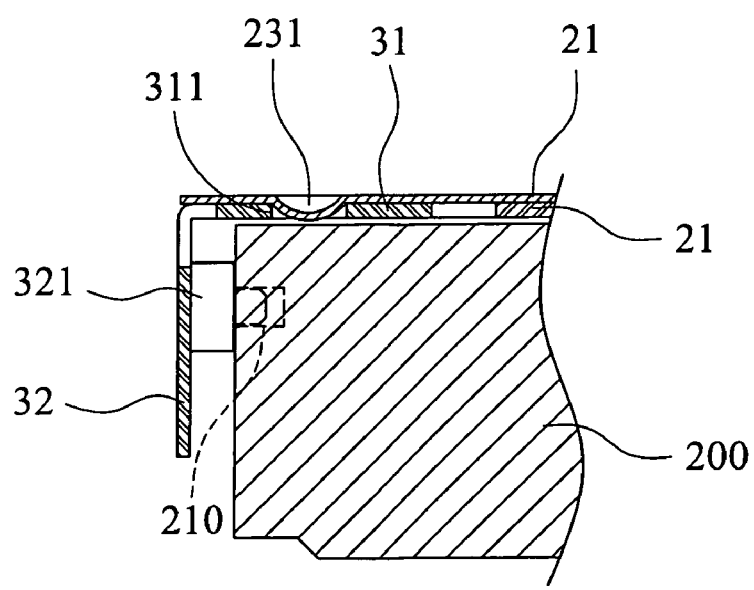
FIG. 3C is a fragmentary cross section taken on line A—A in FIG. 3B.
Figure 4:
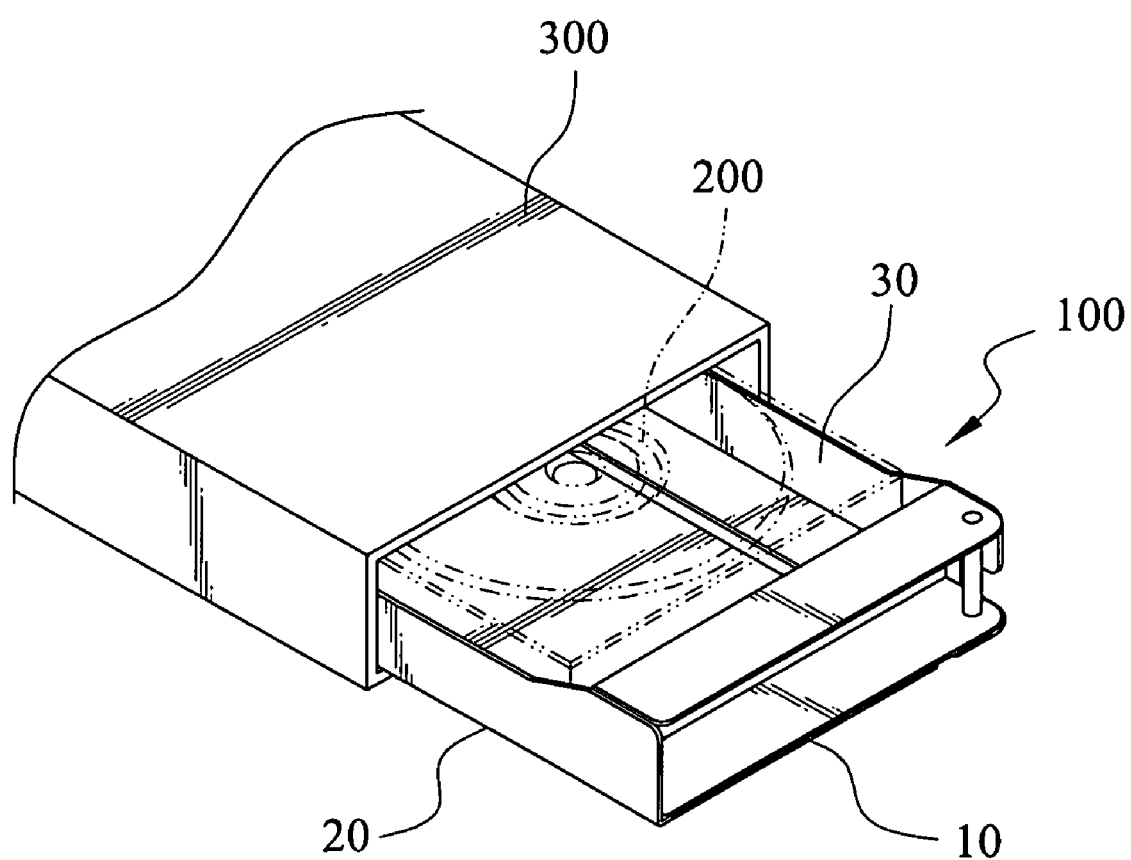
FIG. 4 is a schematic view of a first embodiment of the invention in a use condition.

Referring to FIGS. 3A, 3B and 3C, the latch element 231 is a protrusion on the coupling blade 23. When the fixed bottom plate 21 and the movable bottom plate 31 are moved close to one another, the latch element 231 is latched on the latch hole 311 of the movable bottom plate 31 to couple the movable bottom plate 31 with the fixed bottom plate 21, so that the movable bracket 30 cannot be swiveled freely. Therefore the hard disk 200 may be retained securely on the movable bracket 30 and the fixed bracket 20. After the hard disk 200 is retained on the hard disk anchoring apparatus 100, the hard disk 200 and the hard disk anchoring apparatus 100 may be placed in an outer frame 300 of a computer chassis and fixed in the computer chassis, as shown in FIG. 4.

Figure 5:
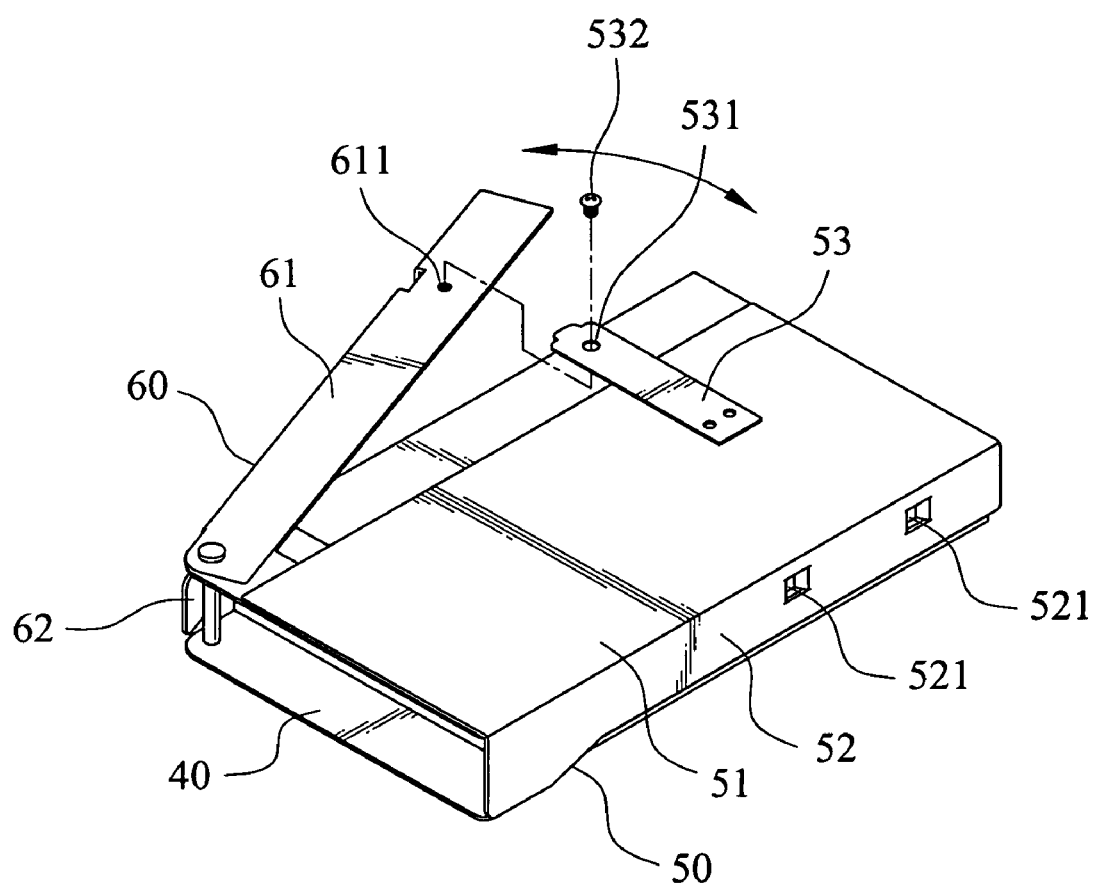
FIGS. 5 and 6 are perspective views of a second embodiment of the invention in various operating conditions.
Figure 6:
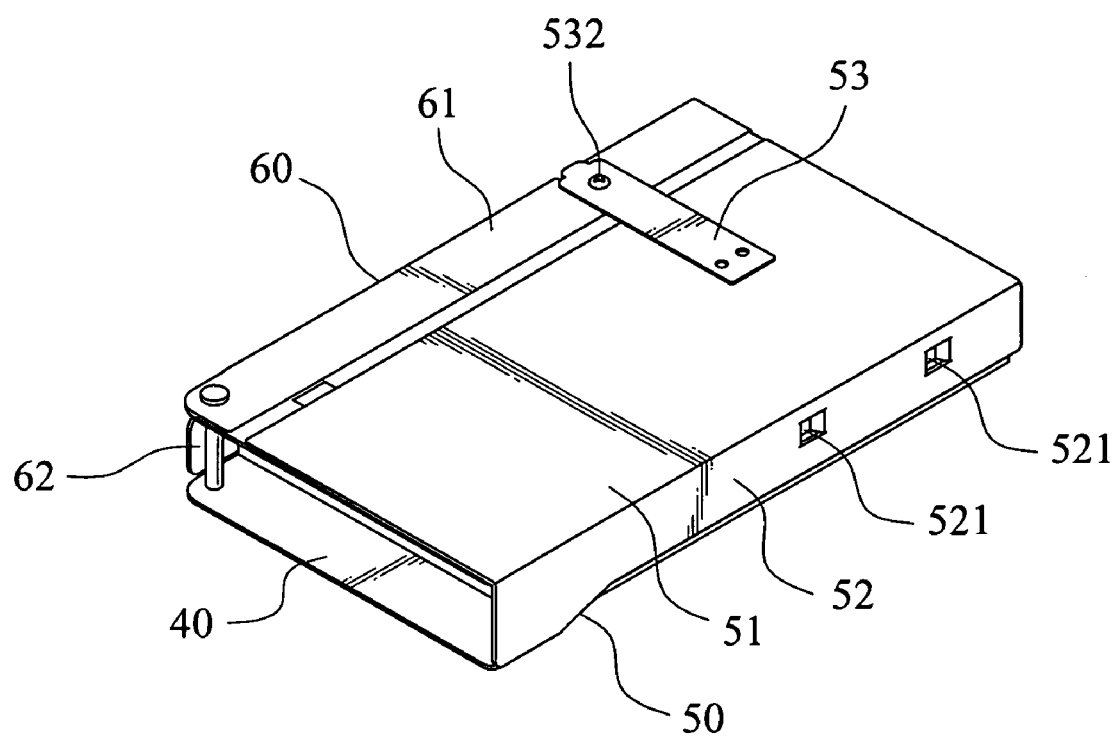

Refer to FIGS. 5 and 6 for a second embodiment of the invention that provides a firmer retaining result to prevent the hard disk 200 from dropping incidentally while removing and loading. The second embodiment is generally constructed like the first embodiment set forth above, and has a coupling seat 40, a fixed bracket 50 fastened to the coupling seat 40, a movable bracket 60 pivotally coupled with the coupling seat 40 and a coupling blade 53.

The fixed bracket 50 has a fixed bottom plate 51 and a fixed side wall 52, which has a plurality of first fasteners 521 to match screw holes formed on one side of the hard disk 200.

The movable bracket 60 has a movable bottom plate 61 and a movable side wall 62. The movable side wall 62 has a plurality of second fasteners (not shown in the drawings) matching the screw holes formed on another side of the hard disk 200. The movable bottom plate 61 has a latch hole 611.

The coupling blade 53 has one end attached to the fixed bottom plate 51 and another end extended outside the fixed bottom plate 51 towards the movable bottom plate 61. The extended end of the coupling blade 53 has a latch element witch can engage with the latch hole 611 of the movable bottom plate 61.

The difference between the second embodiment and the first embodiment is that the latch element 53 of second embodiment comprises an aperture 531 on the coupling blade 53 and a screw 532. When the movable bottom plate 61 is moved close to the fixed bottom plate 51, the aperture 531 is located above the latch hole 611, and they may be coupled through the screw 532 to fasten to a screw hole on the bottom of the hard disk 200. Therefore, one end of the coupling blade 53 is fastened to the movable bottom plate 61 to securely hold the fixed bottom plate 51 and the movable bottom plate 61 together to retain the hard disk 200 securely.

In short, the present invention employs a movable hinge relationship to freely swivel the movable bracket relative to the fixed bracket to form an angle therebetween or make them close to each other. In the close condition, the first and second fasteners formed on the fixed bracket and movable bracket are engaged with the screw holes on the side walls of the hard disk. Thus the hard disk may be retained, installed and removed rapidly without using tools and screws.

What is claimed is:

1. A hard disk anchoring apparatus for retaining a hard disk which has a plurality of screw holes, comprising:
   a coupling seat;
   a fixed bracket which is coupled with the coupling seat and has a fixed bottom plate and a fixed side wall, the fixed side wall having a plurality of first fasteners corresponding to the screw holes formed on one side of the hard disk;
   a movable bracket which is movably hinged on the coupling seat and has a movable bottom plate and a movable side wall, the movable bottom plate having a latch hole, the movable side wall having a plurality of second fasteners corresponding to the screw holes formed on another side of the hard disk; and
   a coupling blade which has one end attached to the fixed bottom plate and a latch element on another end, the latch element being able to engage with the latch hole of the movable bottom plate to couple the fixed bottom plate and the movable bottom plate together;
   wherein the movable bracket is able to be swiveled relative to the coupling seat to be selectively close to the fixed bracket, so that the first fasteners and the second fasteners are engaged with the screw holes on the two sides of the hard disk, and the movable bottom plate and the fixed coupling blade are coupled together through the coupling blade;
   wherein the movable bracket is able to be swiveled relative to the coupling seat to be moved away from the fixed bracket.

2. The hard disk anchoring apparatus of claim 1, wherein the latch element is a protrusion located on the coupling blade.

3. The hard disk anchoring apparatus of claim 1, wherein the latch element comprises an aperture formed on the coupling blade and a screw.

4. The hard disk anchoring apparatus of claim 1, wherein the number of the first fasteners is two, and the number of the second fasteners is two respectively.

5. The hard disk anchoring apparatus of claim 1, wherein each of the first fasteners has a jutting base located on the fixed side wall and a strut located on the jutting base.

6. The hard disk anchoring apparatus of claim 1, wherein each of the second fasteners has a jutting base located on the movable side wall and a strut located on the jutting base.

* * * * *